(12) United States Patent
Yi et al.

(10) Patent No.: US 9,075,533 B2
(45) Date of Patent: Jul. 7, 2015

(54) BINARY TREE STORAGE METHOD AND SYSTEM

(71) Applicant: Huawei Technologies Co., Ltd., Shenzhen, Guangdong (CN)

(72) Inventors: Yi Yi, Chengdu (CN); Rongfeng Hong, Shenzhen (CN); Jian Wang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 248 days.

(21) Appl. No.: 13/864,887

(22) Filed: Apr. 17, 2013

(65) Prior Publication Data
US 2013/0297891 A1    Nov. 7, 2013

(30) Foreign Application Priority Data

Apr. 17, 2012  (CN) .......................... 2012 1 0112704

(51) Int. Cl.
G06F 13/12     (2006.01)
G06F 3/06      (2006.01)
G06F 12/02     (2006.01)
G06F 9/50      (2006.01)
G06F 17/30     (2006.01)

(52) U.S. Cl.
CPC .......... *G06F 3/0644* (2013.01); *G06F 12/0284* (2013.01); *G06F 9/5016* (2013.01); *G06F 17/30961* (2013.01)

(58) Field of Classification Search
CPC ................ G06F 9/5016; G06F 3/0644; G06F 17/30961; G06F 12/0284
USPC ........................................................ 711/153
See application file for complete search history.

(56) References Cited

U.S. PATENT DOCUMENTS

| 2004/0062208 | A1 | 4/2004 | Brown et al. | |
| 2007/0201398 | A1* | 8/2007 | Yang et al. | 370/329 |
| 2011/0202571 | A1* | 8/2011 | Yan et al. | 707/797 |

FOREIGN PATENT DOCUMENTS

| CN | 101022407 A | 8/2007 |
| CN | 101388842 A | 3/2009 |

* cited by examiner

*Primary Examiner* — Jae Yu
(74) *Attorney, Agent, or Firm* — Leydig, Voit & Mayer, Ltd.

(57) ABSTRACT

The present invention is applicable to the field of computer technologies and provides a binary tree storage method and system. The method includes: dividing a binary tree into a root tree and a plurality of subtrees, where the plurality of subtrees is layered and stored in N levels of storages; partitioning the plurality of subtrees into M types according to a preset rule, so that the plurality of subtrees is partitioned into N×M data blocks; and adjusting storage positions of the N×M data blocks in the storages, so that a storage at each level occupies the same number of storage units. In the present invention, storage spaces for nodes at each level, which are spaces of non-uniform sizes, are normalized into spaces of the same size, thereby increasing a space utilization rate of storages.

10 Claims, 5 Drawing Sheets

---

Divide a binary tree into a root tree (root tree) and a plurality of subtrees (subtree), where the plurality of subtrees is layered and stored in N levels of storages — 201

Partition the plurality of subtrees into M types according to a preset rule, so that the plurality of subtrees is partitioned into N × M data blocks — 202

Adjust storage positions of the N × M data blocks in the storages, so that a storage at each level occupies the same number of storage units — 203

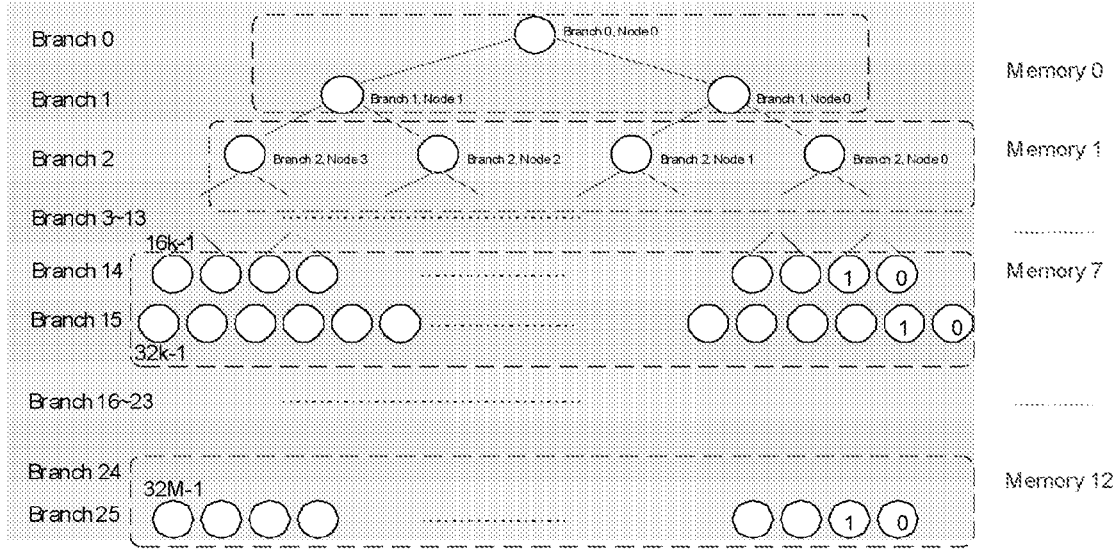

FIG. 1

<Prior Art>

---

Divide a binary tree into a root tree (root tree) and a plurality of subtrees (subtree), where the plurality of subtrees is layered and stored in N levels of storages — 201

Partition the plurality of subtrees into M types according to a preset rule, so that the plurality of subtrees is partitioned into N × M data blocks — 202

Adjust storage positions of the N × M data blocks in the storages, so that a storage at each level occupies the same number of storage units — 203

FIG. 2

BINARY TREE STORAGE METHOD AND SYSTEM

CROSS-REFERENCE TO RELATED APPLICATION

This application claims priority to Chinese Patent Application No. 201210112704.9, filed on Apr. 17, 2012, which is hereby incorporated by reference in its entirety.

FIELD OF THE INVENTION

The present invention is related to the field of computer technologies, and in particular, to a binary tree storage method and system.

BACKGROUND OF THE INVENTION

In most application scenarios of a binary tree, a search structure of a pipeline mode is used to achieve high performance. This requires that nodes in the binary tree are layered and stored by Branch (Branch refers to a set of nodes of the same depth in the binary tree) in different storage units, that is, memories, and the number of times of access to each memory is restricted.

In a current solution, if a binary tree has too many layers, the number of nodes to be stored on last several layers becomes very large, and even exceeds the capacity of an existing monolithic DDR storage component, for example, a storage structure of a binary tree of a height 25 shown in FIG. 1.

As can be seen from the structure shown in FIG. 1, for a binary tree of a fixed shape, when searching is performed, the binary tree is searched from the top down through each layer of Branch, so as to finally obtain a comparison result. In a comparing process, it is not allowed to return to a superior Branch to perform comparison again. In this way, the requirement of occupying a storage body of the last memory for storing nodes of the binary tree is four times larger than the requirement of occupying a storage body of the last but one memory for storing nodes of the binary tree. If nodes on last two layers are to be held in DDR3 chips of the same specification, respectively, for example, a memory at a preceding level is used as the storage body, it may occur that an occupancy requirement of a last level on the storage body is too huge, and the capacity of the memory at a preceding level is too small and cannot store all nodes at the last level. However, if the capacity of the memory is increased and a memory that can completely store all the nodes at the last level is used as the storage body, it may occur that many storage spaces in the memory are left when all nodes at a preceding level are stored and a utilization rate of spaces is too low.

SUMMARY OF THE INVENTION

Embodiments of the present invention provide a binary tree storage method and system, so as to solve the problem that a low memory utilization rate occurs when nodes on last several layers are stored with a storage method in the prior art.

In one aspect, a binary tree storage method is provided, which includes:

dividing a binary tree into a root tree and a plurality of subtrees, where the plurality of subtrees is layered and stored in N levels of storages.

In another aspect, a binary tree storage control apparatus is provided, which includes:

a division unit, configured to divide a binary tree into a root tree and a plurality of subtrees, where the plurality of subtrees is layered and stored in N levels of storages;

a classification unit, configured to partition the plurality of subtrees into M types according to a preset rule, so that the plurality of subtrees is partitioned into N×M data blocks; and a storage control unit, configured to adjust storage positions of the N×M data blocks in the storages, so that a storage at each level has the same number of storage units to be occupied In yet another aspect, a binary tree storage system is provided, which includes an external storage and also includes the binary tree storage control apparatus as described above.

In the embodiments of the present invention, a big binary tree of a fixed shape is divided into a root tree and a plurality of subtrees, where the plurality of subtrees is layered and stored in N levels of storages. The plurality of subtrees is partitioned into M types according to the preset rule, so that the plurality of subtrees is partitioned into N×M data blocks. The storage positions of the N×M data blocks in the storages are adjusted, so that a storage at each level has the same number of storage units to be occupied. In this way, storage spaces for nodes at each level, which are spaces of non-uniform sizes, are normalized into spaces of the same size, thereby increasing a space utilization rate of storages.

BRIEF DESCRIPTION OF THE DRAWINGS

FIG. 1 is a schematic diagram of a storage structure of a binary tree of a height 25 in the prior art;

FIG. 2 is an implementation flow chart of a binary tree storage method provided by Embodiment 1 of the present invention;

DETAILED DESCRIPTION OF THE EMBODIMENTS

To make the objectives, technical solutions, and advantages of the present invention more comprehensible, the following further describes the present invention in detail with reference to the accompanying drawings and embodiments. It is understandable that the specific embodiments are merely used to explain the present invention and are not intended to limit the present invention.

In embodiments of the present invention, a big binary tree of a fixed shape is divided into a root tree and a plurality of subtrees, where the plurality of subtrees is layered and stored in N levels of storages. The plurality of subtrees is partitioned into M types according to a preset rule, so that the plurality of subtrees is partitioned into N×M data blocks. Storage positions of the N×M data blocks in the storages are adjusted, so that a storage at each level has the same number of storage units to be occupied.

Embodiment 1

FIG. 2 shows an implementation process of a binary tree storage method provided by Embodiment 1 of the present invention, which is described in detail in the following.

201: Divide a binary tree into a root tree and a plurality of subtrees (subtree), where the plurality of subtrees is layered and stored in N levels of storages.

In this embodiment, a binary tree of a height m is cut between a Branch n and a Branch (n+1) (n<m, the m and the n are both positive integers, and branch counting of the entire binary tree starts from a Branch 0 layer), a total of $2^{(n+1)}-1$ nodes exist above a Branch n layer (the Branch n layer itself is included), and the $2^{(n+1)}-1$ nodes also form a binary tree, that is, the root tree, which is represented by root tree. $2^{(n+1)}$ binary trees exist below the Branch n layer, where a height of each of the binary trees is m−n−1; and the binary trees below the Branch n layer are represented by subtrees, that is, subtrees. The $2^{(n+1)}$ subtrees are layered and stored in N levels of storages, where N is a positive integer.

Figure 3:
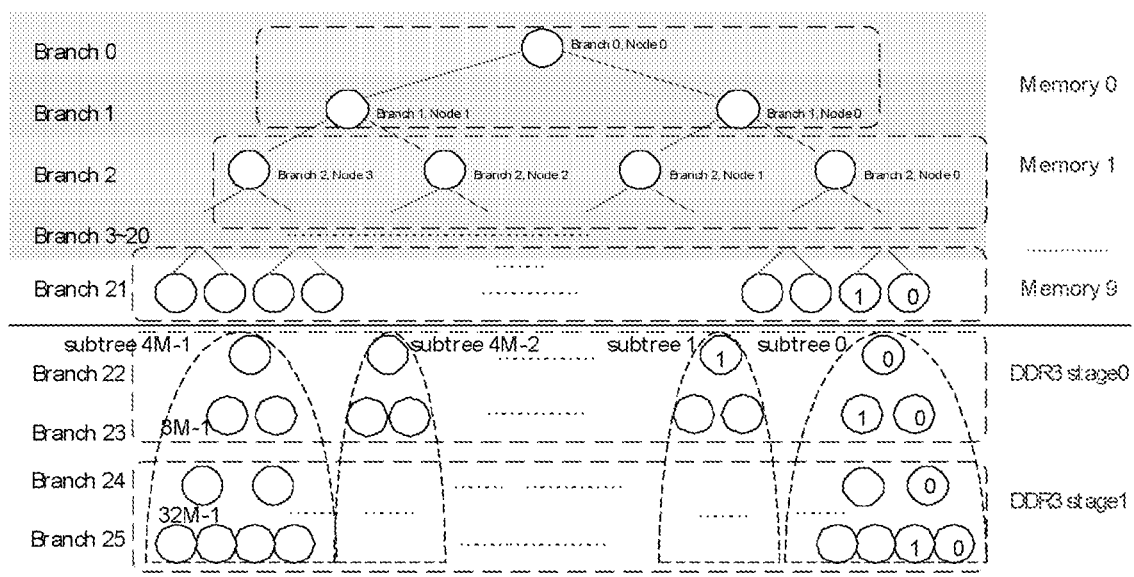
FIG. 3 is a schematic diagram showing how a binary tree of a fixed shape is cut and how nodes after the cutting are associated provided by an embodiment of the present invention.

As shown in FIG. 3, an example that m=26 and n=21 is taken in the following to illustrate how a binary tree of a fixed shape is cut and how nodes after the cutting are associated.

In addition to storing a Key (used for searching the binary tree) value, each node in the root tree above a cut line (a solid black line) also maintains a pointer that points to a subtree (an address of a root node of the subtree to which the pointer points is stored in the pointer). Because the number of nodes in the root tree is less than the number of subtrees by 1, one subtree cannot be used. Branches from a Branch 22 to a Branch 25 in the subtrees may be divided into two parts for storing, where the upper part, that is, the Branch 22 and the Branch 23, are stored in an external storage DDR3 stage0, and the lower part, that is, the Branch 24 and the Branch 25, are stored in an external storage DDR3 stage1.

202: Partition the plurality of subtrees into M types according to a preset rule, so that the plurality of subtrees is partitioned into N×M data blocks.

For classification of subtrees, different manners may be adopted to partition the subtrees into M types, where the M may be a positive integer, such as 2 and 3. For example, in this embodiment, according to the parity of numbers of first nodes of binary trees, the subtrees are partitioned into two types, that is, odd subtrees and even subtrees.

203: Adjust storage positions of the N×M data blocks in the storages, so that a storage at each level has the same number of storage units to be occupied.

When N=2 and M=2, adjusting the storage positions of the N×M data blocks in the storages, so that a storage at each level has the same number of storage units to be occupied is specifically:

storing an upper part and a lower part of a first type of subtrees in a second level storage and a first level storage, respectively, and storing an upper part and a lower part of a second type of subtrees in the first level storage and the second level storage, respectively.

Figure 4:
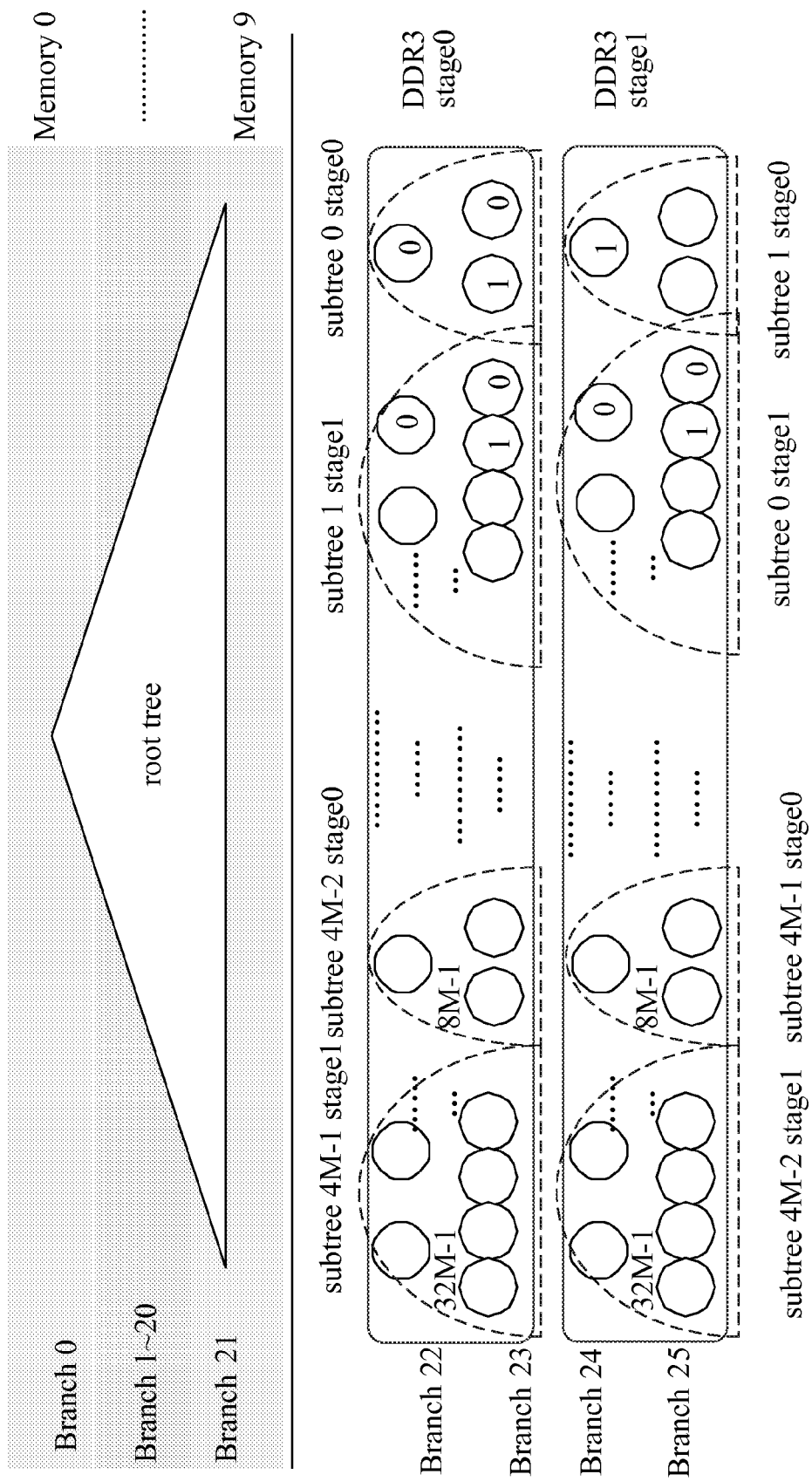
FIG. 4 is a schematic diagram of a storage structure of a binary tree of a height 25 provided by Embodiment 1 of the present invention.

In this embodiment, as shown in FIG. 4, the first type of subtrees are odd subtrees, and the second type of subtrees are even subtrees. An upper part (the Branch 22 and the Branch 23) of an odd subtree (subtree 4M−1) is stored in the second level storage (DDR3 stage1), and a lower part (the Branch 24 and the Branch 25) of the odd subtree is stored in the first level storage (DDR3 stage0). An upper part (the Branch 22 and the Branch 23) of an even subtree (subtree 4M−2) is stored in the first level storage (DDR3 stage0), and a lower part (the Branch 24 and the Branch 25) of the even subtree is stored in the second level storage (DDR3 stage1). The M represents the twentieth power of 2, that is, 1024*1024=1048576.

In this embodiment, after the upper part and the lower part of the odd subtree are stored in the second level storage and the first level storage, respectively, migration computation relative to an original storage address may be performed on the lower part of the even subtree, so that the lower part of the even subtree is stored in a position where the upper part of the odd subtree is stored, and the upper part of the odd subtree is stored in a position where the lower part of the even subtree is stored.

In this way, storage spaces for nodes at the last two levels, which are a big space and a small space that are non-uniform, may be normalized into spaces of the same size, thereby increasing a space utilization rate of storages. For example, the stage0 originally needs a space of a size X, if each stage holds two layers of nodes, the stage1 needs a space of a size 4X. If a conventional manner is adopted, a storage of a size X and a storage of a size 4X are needed to store a tree structure. If the storage method provided by the embodiment of the present invention is adopted, two storages of a size 2.5X may be used for implementation, and the objective of purchase of normalized storages and increase of a storage utilization rate may be achieved.

After the subtrees are stored in the external storages DDR3, the binary tree may be searched, and a specific searching process includes the following steps.

Step 1: Access the root tree root tree.

Step 2: Determine whether an even subtree is accessed, if an even subtree is accessed, perform step 3; otherwise, perform step 4.

Step 3: First access a first level storage, perform comparison to determine whether a numerical value stored in a current node is equal to a value of a key word Key, if yes, end the searching; otherwise, access a second level storage, perform comparison to determine whether a numerical value stored in a current node is equal to the value of the key word Key, and obtain a final result.

The first level storage is a DDR3 stage0 storage, and the second level storage is a DDR3 stage1 storage.

Step 4: First access a second level storage, perform comparison to determine whether a numerical value stored in a current node is equal to a value of a key word Key, if yes, end the searching; otherwise, access a first level storage, perform comparison to determine whether a numerical value stored in a current node is equal to the value of the key word Key, and obtain a final result.

In addition, it should be specifically noted that a request for accessing an even subtree (or an odd subtree) does not switch midway from the current even subtree (or odd subtree) to another odd subtree (or even subtree) because of searched branch jumping.

Nodes at next several levels of the binary tree are stored in storages of multiple levels, and the nodes may also be stored and accessed in this manner.

In addition, it should also be noted that, when a node Node is added or deleted, a node is only displaced or moved in the same even subtree (or odd subtree). In a moving process, it only needs to maintain that an even subtree is accessed in a sequence from the first level storage to the second level storage and an odd subtree is accessed in a sequence from the second level storage to the first level storage, so that access correctness can be ensured.

Further, for the classification of subtrees, different manners may be adopted to classify the subtrees into a plurality of types and store the subtrees in the storages in an optimal manner.

A balanced storage solution for three-level non-uniform storage is given as follows.

Figure 5:
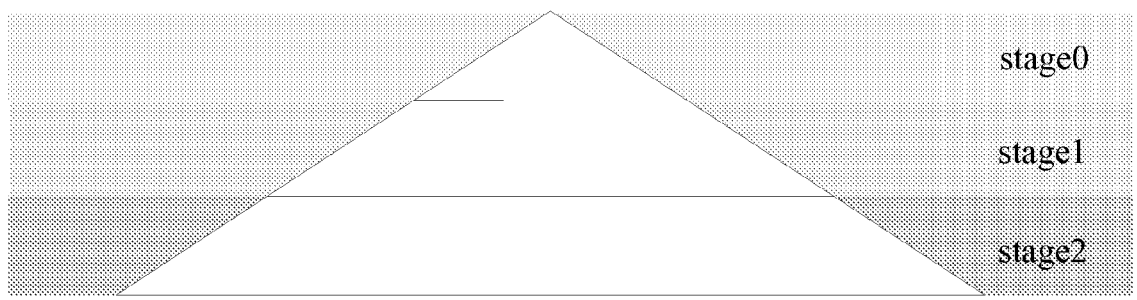
FIG. 5 is a schematic diagram of an original non-uniform three-level storage structure provided by an embodiment of the present invention.

As shown in FIG. 5, it is a schematic diagram of an original non-uniform three-level storage structure, in which a relationship among storage spaces is stage0<stage1<stage2.

Figure 6:
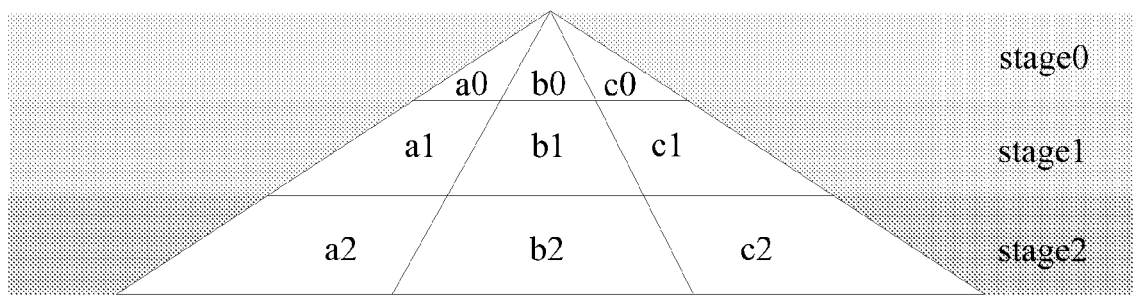
FIG. 6 is a schematic structural diagram of non-uniform storage spaces after cutting provided by an embodiment of the present invention.

Because sizes of original storage spaces are at three levels, a storage space at each level is divided into three equal shares. As shown in FIG. 6, it is a schematic structural diagram of non-uniform storage spaces after cutting, where a0, b0, and c0 occupy the same number of storage units, a1, b1, and c1 occupy the same number of storage units, a2, b2, and c2 occupy the same number of storage units, and a0<a1<a2.

Figure 7:
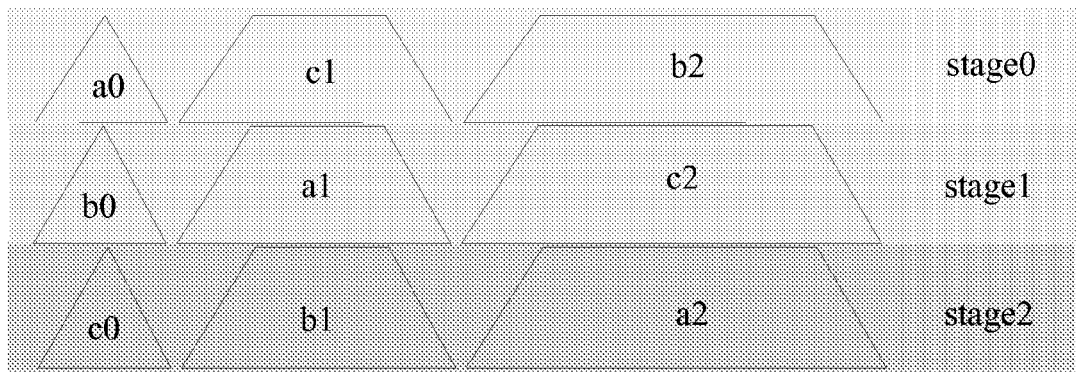
FIG. 7 is a schematic diagram of a uniform storage structure after adjusting provided by an embodiment of the present invention.

Positions of storage spaces of certain storage units are adjusted, so that a storage at each level occupies the same number of storage units. As shown in FIG. 7, it is a schematic diagram of a uniform storage structure after the adjusting.

Likewise, non-uniform spaces of n levels may be normalized into spaces of the same size at each level. After the normalization, a size of a storage space required for each level is (stage0+stage1+ . . . +stagen−1)/n, thereby achieving the objective of increasing a storage utilization rate.

Embodiment 2

Figure 8:
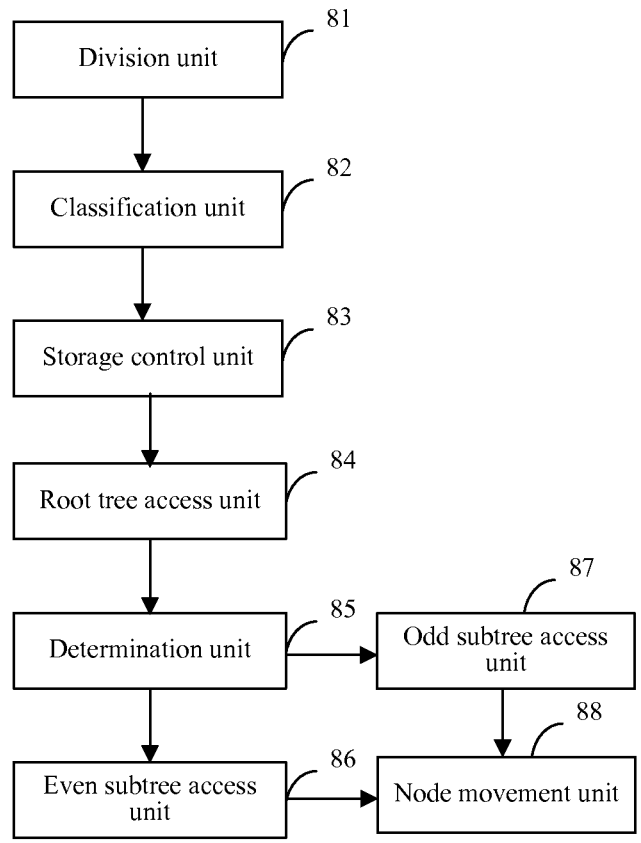
FIG. 8 is a structural block diagram of a binary tree storage control apparatus provided by Embodiment 2 of the present invention.

FIG. 8 shows a specific structural block diagram of a binary tree storage control apparatus provided by Embodiment 2 of the present invention. For ease of illustration, only a part related to the embodiment of the present invention is shown. The binary tree storage control apparatus includes: a division unit 81, a classification unit 82, and a storage control unit 83.

The division unit 81 is configured to divide a binary tree into a root tree and a plurality of subtrees, where the plurality of subtrees is layered and stored in N levels of storages.

The classification unit 82 is configured to partition the plurality of subtrees into M types according to a preset rule, so that the plurality of subtrees is partitioned into N×M data blocks. When M=2, the subtrees are specifically divided into odd subtrees and even subtrees according to the parity of numbers of first nodes of binary trees.

The storage control unit 83 is configured to adjust storage positions of the N×M data blocks in the storages, so that a storage at each level occupies the same number of storage units. When N=2 and M=2, the storage control unit 83 is configured to store an upper part and a lower part of a first type of subtrees into a second level storage and a first level storage, respectively, and store an upper part and a lower part of a second type of subtrees into the first level storage and the second level storage, respectively.

Further, the apparatus also includes: a root tree access unit 84, a determination unit 85, an even subtree access unit 86, and an odd subtree access unit 87.

The root tree access unit 84 is configured to access the root tree.

The determination unit 85 is configured to determine whether an even subtree is accessed.

The even subtree access unit 86 is configured to first access the first level storage if an even subtree is accessed, perform comparison to determine whether a numerical value stored in a current node is equal to a value of a key word Key, if yes, end the searching; otherwise, access the second level storage, perform comparison to determine whether a numerical value stored in a current node is equal to the value of the key word Key, and obtain a final result.

The odd subtree access unit 87 is configured to first access the second level storage if an odd subtree is accessed, perform comparison to determine whether a numerical value stored in a current node is equal to a value of a key word Key, if yes, end the searching; otherwise, access the first level storage, perform comparison to determine whether a numerical value stored in a current node is equal to the value of the key word Key, and obtain a final result.

Further, the apparatus also includes: a node movement unit 88.

The node movement unit 88 is configured to displace or move a node in the same even subtree or odd subtree.

Specifically, reference may be made to the method embodiment shown in FIG. 2, which is not described herein again.

Embodiment 3

Figure 9:
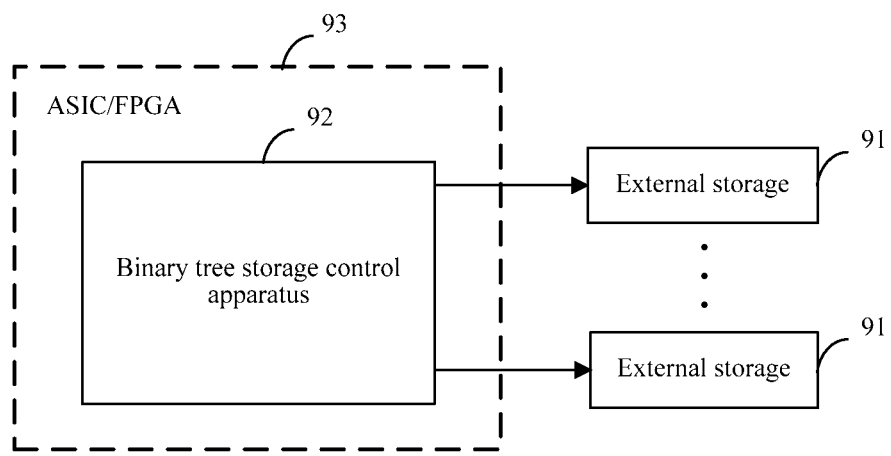
FIG. 9 is a structural block diagram of a binary tree storage system provided by Embodiment 3 of the present invention.

FIG. 9 is a structural block diagram of a binary tree storage system provided by Embodiment 3 of the present invention. For ease of illustration, only a part related to the embodiment of the present invention is shown. The binary tree storage system includes a plurality of external storages (External RAM) 91, and also includes the binary tree storage control apparatus 92 shown in FIG. 8, where the binary tree storage control apparatus 92 is built inside an application-specific integrated circuit (application-specific integrated circuit, ASIC)/field-programmable logic gate array (FPGA, field-programmable gate array) 93.

In the embodiment of the present invention, a binary tree is divided into a root tree and a plurality of subtrees, where the plurality of subtrees is layered and stored in N levels of storages. The plurality of subtrees is partitioned into M types according to a preset rule, so that the plurality of subtrees is partitioned into N×M data blocks. Storage positions of the N×M data blocks in the storages are adjusted, so that a storage at each level occupies the same number of storage units. In this way, storage spaces for nodes at each level, which are spaces of non-uniform sizes, are normalized into spaces of the same size, thereby increasing a space utilization rate of storages.

The foregoing description is merely exemplary embodiments of the present invention, but is not intended to limit the present invention. Any modifications, equivalent substitutions, and improvements made within the idea and principle of the present invention shall fall within the protection scope of the present invention.

What is claimed is:

1. A binary tree storage method, comprising:
    dividing a binary tree into a root tree and a plurality of subtrees, wherein the plurality of subtrees is layered and stored in N levels of storages;
    partitioning the plurality of subtrees into M types according to a preset rule so that the plurality of subtrees is partitioned into N×M data blocks, wherein N=2 and M=2; and
    adjusting storage positions of the N×M data blocks in the N levels of storages so that, at each level, each storage at the level occupies the same number of storage units, wherein the adjusting the storage positions of the N×M data blocks in the N levels of storages comprises:
    storing an upper part of a first type of subtrees in a second level storage,
    storing a lower part of the first type of subtrees in a first level storage, storing an upper part of a second type of subtrees in the first level storage, and storing a lower part of the second type of subtrees in the second level storage.

2. The method according to claim 1, wherein when M=2, the partitioning the plurality of subtrees into M types according to the preset rule comprises:

dividing the subtrees into odd subtrees and even subtrees according to a parity of numbers of first nodes of binary trees.

3. The method according to claim 1, wherein after the step of storing the upper part and the lower part of the first type of subtrees in the second level storage and the first level storage, respectively, and storing the upper part and the lower part of the second type of subtrees in the first level storage and the second level storage, respectively, the method further comprises searching the binary tree, wherein searching the binary tree comprises:

accessing the root tree;

determining whether an even subtree is accessed;

if an even subtree is accessed, first accessing the first level storage, performing comparison to determine whether a numerical value stored in a current node is equal to a value of a key word, if yes, ending the searching; otherwise, accessing the second level storage, performing comparison to determine whether a numerical value stored in a current node is equal to the value of the key word, and obtaining a final result;

if an odd subtree is accessed, first accessing the second level storage, performing comparison to determine whether a numerical value stored in a current node is equal to a value of the key word, if yes, ending the searching; otherwise, accessing the first level storage, performing comparison to determine whether a numerical value stored in a current node is equal to the value of the key word, and obtaining a final result.

4. The method according to claim 3, wherein after searching the binary tree, the method further comprises adding or deleting a node, wherein the adding or deleting the node comprises:

displacing or moving a node within a subtree.

5. A binary tree storage control apparatus, the apparatus comprising:

a division unit, configured to divide a binary tree into a root tree and a plurality of subtrees, wherein the plurality of subtrees is layered and stored in N levels of storages;

a classification unit, configured to partition the plurality of subtrees into M types according to a preset rule so that the plurality of subtrees is partitioned into N×M data blocks, wherein N=2 and M=2; and a storage control unit, configured to adjust storage positions of the N×M data blocks in the N levels of storages so that, at each level, each storage at the level occupies the same number of storage units, wherein the storage control unit is configured to:

store an upper part of a first type of subtrees in a second level storage, store a lower part of the first type of subtrees in a first level storage, store an upper part of a second type of subtrees in the first level storage, and store a lower part of the second type of subtrees in the second level storage.

6. The apparatus according to claim 5, wherein the classification unit divides the subtrees into odd subtrees and even subtrees according to a parity of numbers of first nodes of binary trees.

7. The apparatus according to claim 5, further comprising:

a root tree access unit, configured to access the root tree;

a determination unit, configured to determine whether an even subtree is accessed;

an even subtree access unit, configured to first access the first level storage if an even subtree is accessed, perform comparison to determine whether a numerical value stored in a current node is equal to a value of a key word, if yes, end the searching; otherwise, access the second level storage, perform comparison to determine whether a numerical value stored in a current node is equal to the value of the key word, and obtain a final result;

an odd subtree access unit, configured to first access the second level storage if an odd subtree is accessed, perform comparison to determine whether a numerical value stored in a current node is equal to a value of the key word, if yes, end the searching; otherwise, access the first level storage, perform comparison to determine whether a numerical value stored in a current node is equal to the value of the key word and obtain a final result.

8. The apparatus according to claim 5, further comprising:

a node movement unit, configured to displace or move a node within a subtree.

9. A binary tree storage system, comprising:

a plurality of external storages; and a binary tree storage control apparatus that includes:

a division unit, configured to divide a binary tree into a root tree and a plurality of subtrees, wherein the plurality of subtrees is layered and stored in N levels of storages, a classification unit, configured to partition the plurality of subtrees into M types according to a preset rule so that the plurality of subtrees is partitioned into N×M data blocks, wherein N=2 and M=2, and a storage control unit, configured to adjust storage positions of the N×M data blocks in the N levels of storages so that, at each level, each storage at the level occupies the same number of storage units, wherein the storage control unit is configured to: store an upper part of a first type of subtrees in a second level storage store a lower part of the first type of subtrees in a first level storage, store an upper part of a second type of subtrees in the first level storage, and store a lower part of the second type of subtrees in the second level storage.

10. The system according to claim 9, wherein the binary tree storage control apparatus is built inside an application-specific integrated circuit (ASIC) or a field-programmable logic gate array (FPGA).

* * * * *